(12) United States Patent
Taylor

(10) Patent No.: US 7,099,331 B2
(45) Date of Patent: Aug. 29, 2006

(54) SYSTEM AND METHODS FOR MONITORING A NETWORK WORKLOAD

(75) Inventor: Scott P. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 845 days.

(21) Appl. No.: 10/134,771

(22) Filed: Apr. 29, 2002

(65) Prior Publication Data

US 2003/0202533 A1 Oct. 30, 2003

(51) Int. Cl.
*H04L 12/56* (2006.01)
(52) U.S. Cl. .................. 370/395.41; 709/104
(58) Field of Classification Search ................ 370/351, 370/386, 395.21, 395.41, 401, 428, 429; 709/104, 224, 225, 226, 229
See application file for complete search history.

(56) References Cited

U.S. PATENT DOCUMENTS

| | | | |
|---|---|---|---|
| 5,684,799 A | 11/1997 | Bigham et al. | |
| 6,041,051 A | 3/2000 | Doshi et al. | |
| 6,167,239 A | 12/2000 | Wright et al. | |
| 6,424,646 B1 | 7/2002 | Gerszberg et al. | |
| 6,754,699 B1* | 6/2004 | Swildens et al. | 709/217 |
| 2001/0028644 A1 | 10/2001 | Barzegar et al. | |
| 2001/0030950 A1 | 10/2001 | Chen et al. | |
| 2001/0037256 A1* | 11/2001 | Yazawa | 705/26 |
| 2002/0099663 A1* | 7/2002 | Yoshino et al. | 705/65 |
| 2002/0167965 A1 | 11/2002 | Beasley et al. | |
| 2003/0221127 A1* | 11/2003 | Risan et al. | 713/201 |

* cited by examiner

*Primary Examiner*—Brenda Pham
(74) *Attorney, Agent, or Firm*—Harness Dickey & Pierce PLC

(57) ABSTRACT

A system for monitoring a workload for a data content delivery apparatus of a communications network. The delivery apparatus delivers content to mobile users via buffered RF link over a fixed bandwidth. A last router routes the content from the delivery apparatus to RF link buffer(s) for transmission to the users. A monitor determines, from the delivery apparatus, parameters describing the content and determines, from the router, bandwidth utilization via the buffer(s), and reports, to the delivery apparatus, bandwidth available for allocation to the content based on the parameters and the bandwidth utilization. The system tracks overall data transfer rates for the network and provides information that can be used to optimize available bandwidth.

22 Claims, 3 Drawing Sheets

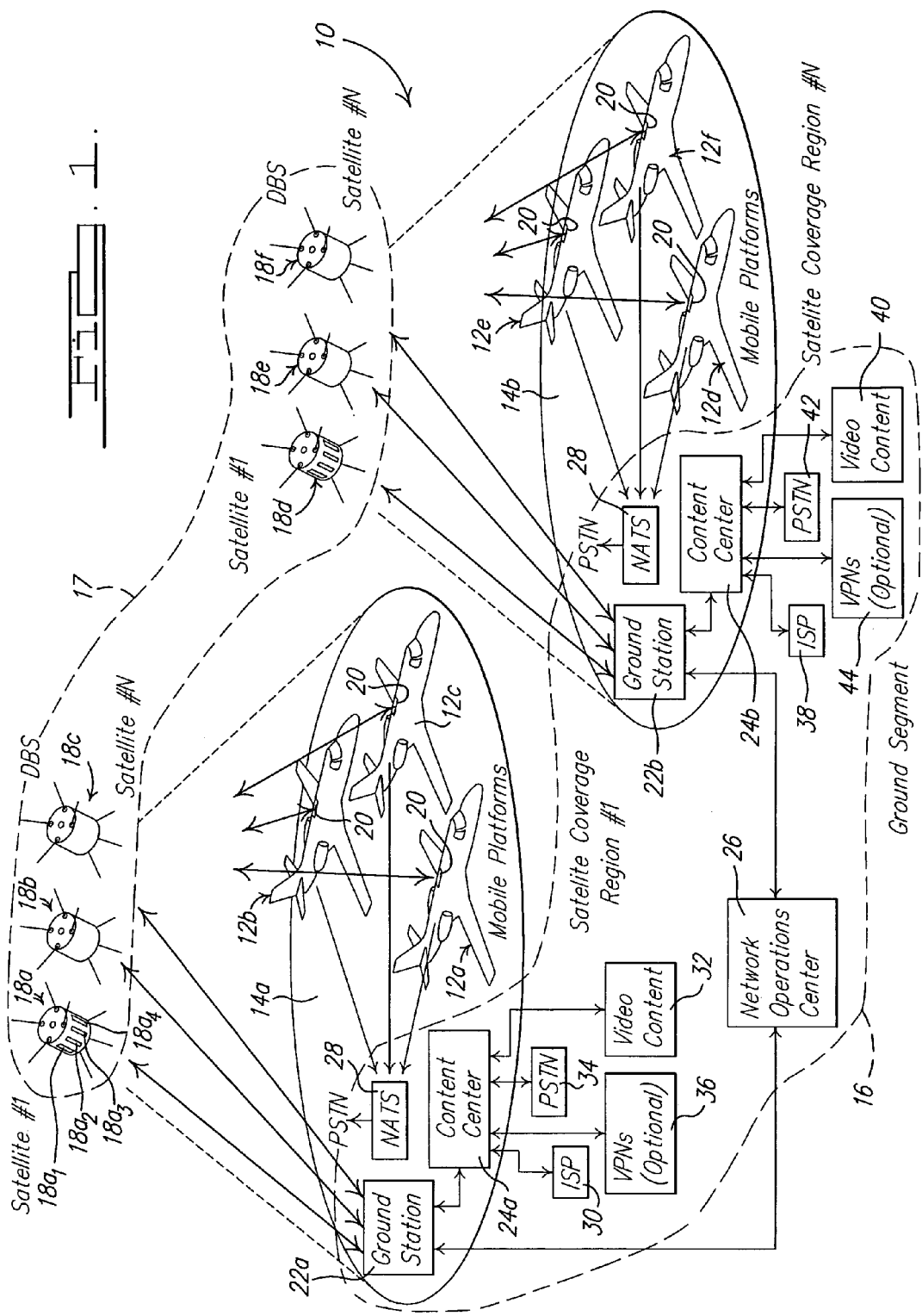

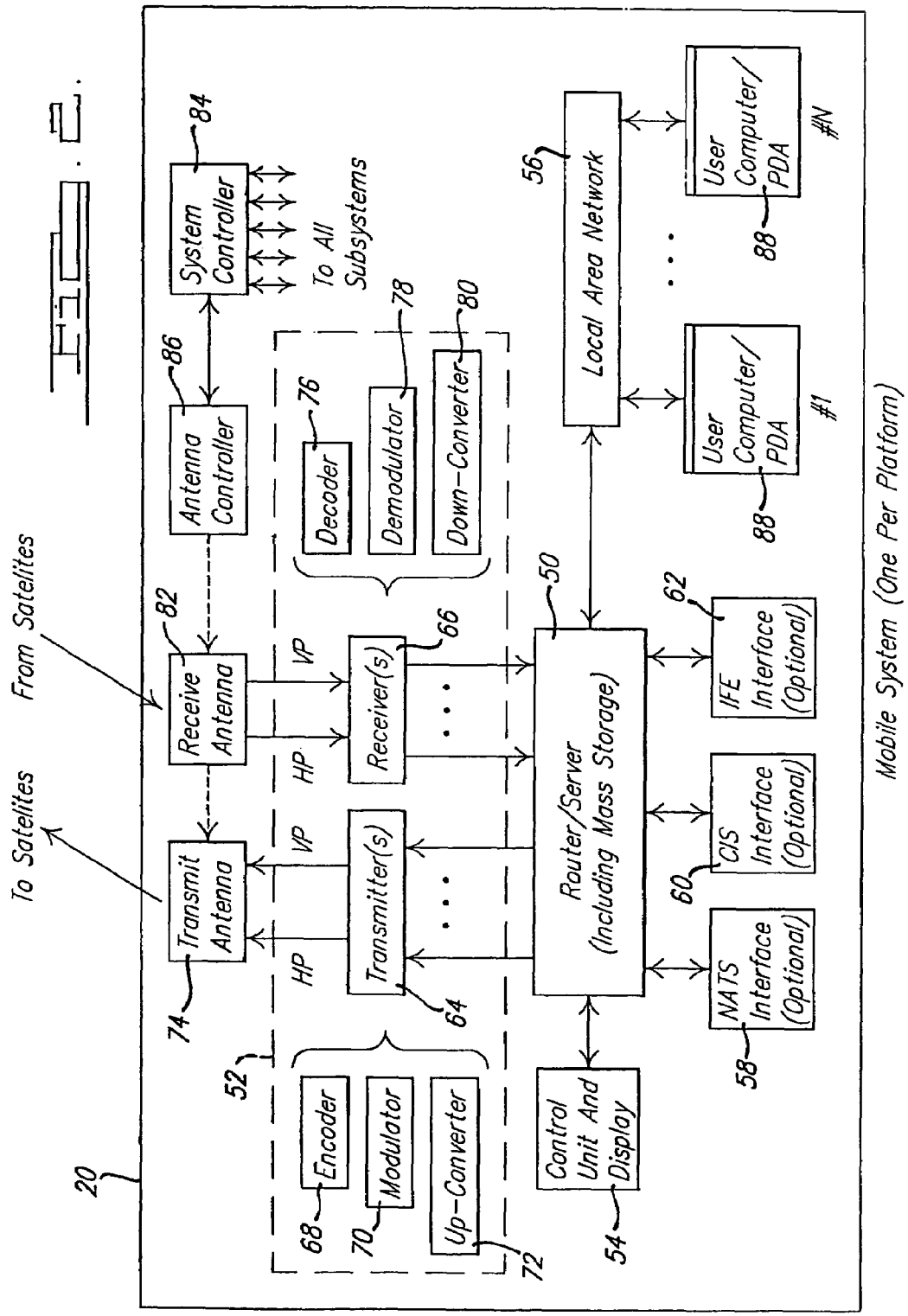

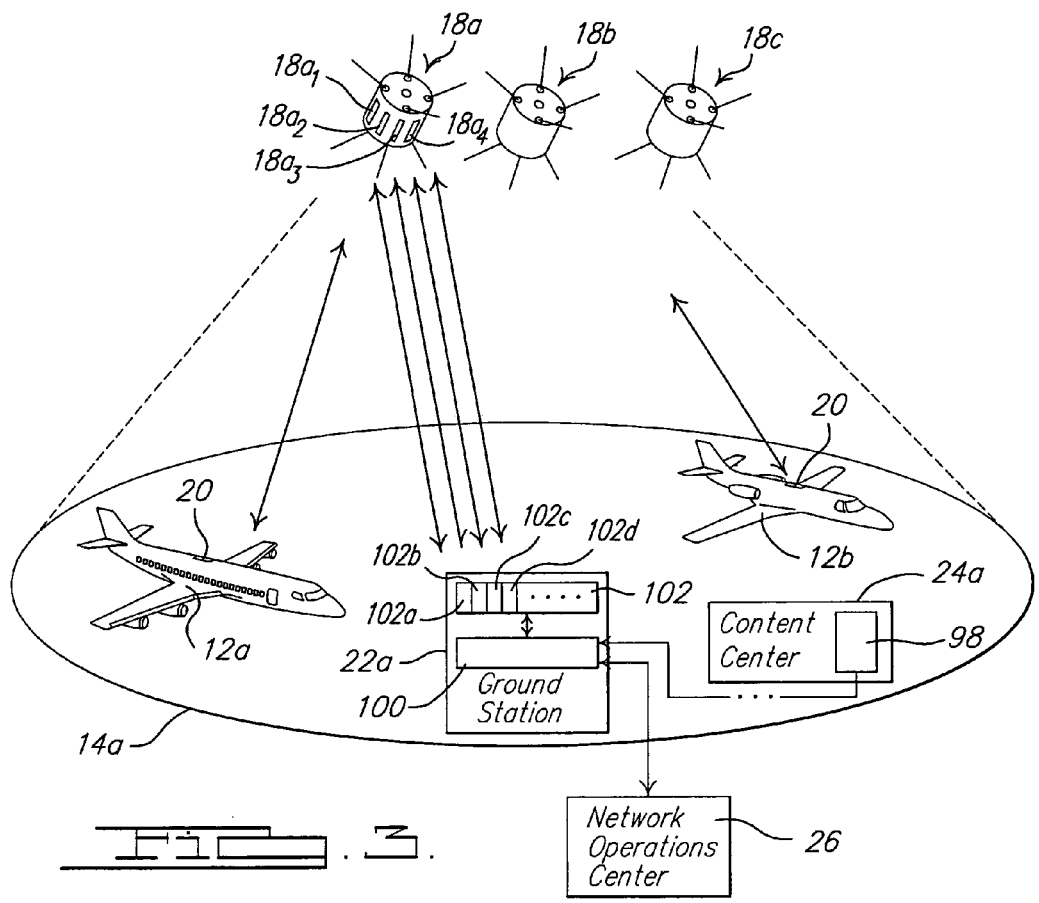
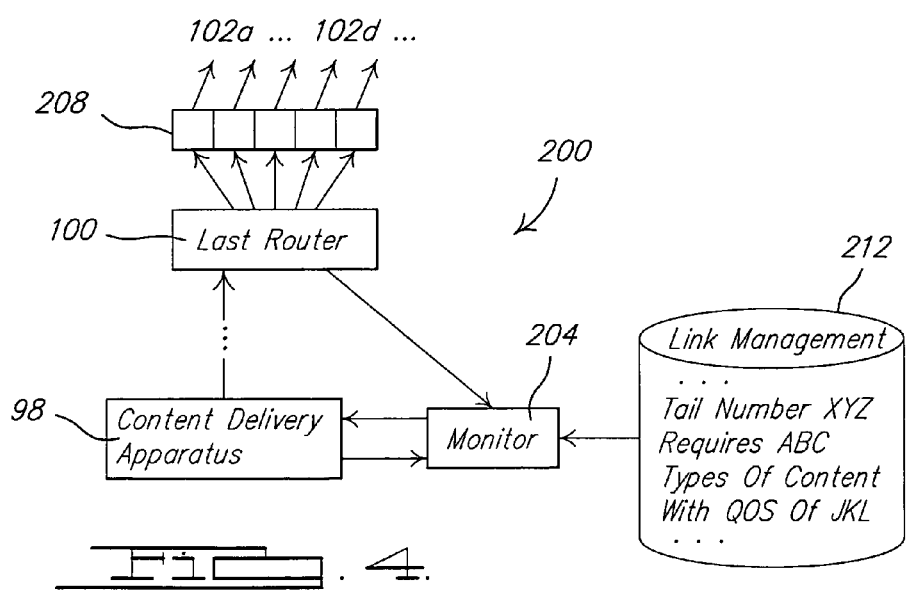

SYSTEM AND METHODS FOR MONITORING A NETWORK WORKLOAD

FIELD OF THE INVENTION

The present invention relates generally to communications networks and, more particularly, to a system for monitoring a communications network content delivery workload.

BACKGROUND OF THE INVENTION

Broadband data and video services have not been widely available to users on mobile platforms such as aircraft, boats, trains, and automobiles. Network systems have traditionally been limited in bandwidth and link capacity, making it prohibitively expensive and/or unacceptably slow to distribute such services to all passengers on a mobile platform. Certain limited services are available to provide video programming to a mobile platform. For example, one service provides either TV broadcast services from available direct broadcast signals (i.e. Echostar® and DirecTV®) or provides a custom TV broadcast signal through dedicated satellite links (i.e. Airshow®).

Limited Internet access also is currently available to a user on a mobile platform. For example, a narrow-bandwidth Internet connection is available via a standard computer telephone modem between a user's computer and the air-ground or ship-shore telephony system. Another service is anticipated to provide world-wide-web content to users on a mobile platform. The web content, however, is pre-stored on a server located on the mobile platform and is updated while the platform is in an inactive mode, for example, when an aircraft is parked at an airport gate or when a ship is docked at a port.

A system described in co-pending U.S. patent application Ser. No. 09/639,912, the disclosure of which is incorporated herein in its entirety by reference, provides bi-directional data services and live television programming to mobile platforms. Data content is transferred via satellite communications link between a ground-based control segment and a mobile RF transceiver system carried on each mobile platform. Each user on each mobile platform is able, using a laptop, personal digital assistant (PDA) or other computing device, to interface with an on-board server. Each user can independently request and obtain, for example, Internet access, company intranet access and live television programming. Real-time programming is supplied, for example, by Direct Broadcast Satellite (DBS) service providers such as Echostar® and DirecTV®. The content is kept fresh by periodic updates from at least one ground-based server.

As on-board users make various requests for data content and network access, the ground segment must coordinate the requests and deliver the requested content in a timely manner to each platform from which requests have originated. As passengers make use of on-board communication services with increasing frequency, it becomes increasingly desirable to optimize usage of fixed bandwidth so that quality of data transmission to the platforms can be maintained at levels acceptable to onboard users of these services.

SUMMARY OF THE INVENTION

In one preferred form, the present invention provides a system for monitoring a workload for a data content delivery apparatus of a communications network. The content delivery apparatus is configured to deliver content to a plurality of mobile users via at least one buffered RF link over a fixed bandwidth. The system includes a last router configured to route the content from the content delivery apparatus to a plurality of RF link buffers for transmission to the users. The system also includes a monitor configured to determine, from the content delivery apparatus, a plurality of parameters describing the content for delivery. The monitor is also configured to determine, from the router, utilization of the bandwidth via the buffer(s), and to report, to the content delivery apparatus, bandwidth available for allocation to the content based on the parameters and the bandwidth utilization.

The above system tracks overall data transfer rates for the network and thereby provides information that can be used to optimize available bandwidth. Thus content is transferred to users when there is likely to be sufficient bandwidth available to support the transfer, and unused bandwidth is minimized.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a block diagram illustrating a mobile communication network;

FIG. 2 is a block diagram illustrating a mobile system carried on each mobile platform;

FIG. 3 is a block diagram illustrating a portion of the mobile communication network shown in FIG. 1; and FIG. 4 is a block diagram illustrating a system for monitoring a workload for a data content delivery apparatus of a communications network such as that shown in FIG. 1.

DETAILED DESCRIPTION OF THE PREFERRED EMBODIMENTS

The following description of the preferred embodiments is merely exemplary in nature and is in no way intended to limit the invention, its application, or uses. A mobile communication system is generally indicated in FIG. 1 by reference numeral 10. The system 10 provides bi-directional data services and live television programming to users on mobile platforms 12a–12f in one or more coverage regions 14a and 14b. The system 10 includes a ground-based segment 16, a plurality of orbiting satellites 18a–18f, and a mobile communications system 20 disposed on each moving platform 12. Each mobile system 20 is in bi-directional communication with at least one of the satellites 18.

As described below, the present invention in one embodiment is directed to a system for monitoring a workload for a communications network that provides communication between a content delivery apparatus and a plurality of mobile users communicating over the network via RF links. Where the users are situated on mobile platforms, such platforms could include aircraft, cruise ships or any other mobile vehicle. Thus the illustration of the mobile platforms 12 as aircraft herein, and the reference to the mobile platforms as aircraft throughout the following description, should not be construed as limiting the applicability of the system 10 and/or the present invention to only aircraft. Furthermore, embodiments of the invention can be practiced in connection with other types of mobile networks operating over fixed bandwidth, for example, cell telephone networks, and in connection with mobile users not necessarily situated in mobile platforms during network use.

The system 10 may include any number of satellites 18 in each coverage region 14a and 14b needed to provide coverage for each region. Satellites 18a, 18b, 18d and 18e are preferably Ku- or Ka-band satellites. Satellites 18c and 18f are Broadcast Satellite Services (BSS) satellites. Each of the satellites 18 is further located in a geostationary orbit (GSO) or a non-geostationary orbit (NGSO). Examples of NGSO orbits include low Earth orbit (LEO), medium Earth orbit (MEO) and highly elliptical orbit (HEO). Each of the satellites 18 includes at least one radio frequency (RF) transponder. Satellite 18a, for example, is illustrated as having four transponders $18a_1$–$18a_4$. Each other satellite 18 illustrated could have a greater or lesser number of RF transponders for handling the anticipated number of mobile platforms 12 operating in the associated satellite coverage area 14. The transponders provide "bent-pipe" communications between the aircraft 12 and the ground segment 16. The frequency bands used for these communication links could include any radio frequency band from approximately 10 MHz to 100 GHz.

The transponders preferably include Ku-band transponders in the frequency band designated by the Federal Communications Commission (FCC) and the International Telecommunications Union (ITU) for Fixed Satellite Services (FSS) or BSS satellites. Also, different types of transponders may be used (i.e., each satellite 18 need not include a plurality of identical types of transponders) and each transponder may operate at a different frequency. Each of the transponders $18a_1$–$18a_4$ further includes wide geographic coverage, high effective isotropic radiated power (EIRP) and high gain/noise temperature (G/T).

The ground segment 16 includes one or more ground stations 22, e.g. stations 22a and 22b as shown in FIG. 1, in bi-directional communication with at least one of the satellites 18. Each ground station 22 also is in bi-directional communication with an associated content center 24. Each ground station 22 also is in bi-directional communication with a network operations center (NOC) 26 via a terrestrial ground link or other suitable communication link. An optional air telephone system 28, e.g. the National Air Telephone System (NATS), may provide a return link from a mobile platform 12 alternative to that provided by the satellites 18. Each ground station 22 may be located anywhere within its associated coverage region 14.

Referring to coverage area 14a, the ground station 22a includes an antenna and associated antenna control electronics for transmitting data content to the satellites 18a and 18b. The antenna of the ground station 22a may also be used to receive data content transponded by the transponders $18a_1$–$18a_4$ originating from each mobile system 20 of each aircraft 12 within the coverage region 14a.

The content center 24 in each coverage region 14 is in communication with a variety of external data content providers and controls the transmission of video and data information received by it to the associated ground station 22. The content center 24a is in contact, for example, with an Internet service provider (ISP) 30, a video content source 32 and a public switched telephone network (PSTN) 34. Optionally, the content center 24a can also communicate with one or more virtual private networks (VPNs) 36. The ISP 30 provides Internet access to each of the occupants of each aircraft 12a–12c. The video content source 32 provides live television programming, for example, Cable News Network® (CNN) and ESPN®. The NOC 26 performs traditional network management, user authentication, accounting, customer service and billing tasks. The content center 24b associated with the ground station 22b in the coverage region 14b is in communication with an ISP 38, a video content provider 40, a PSTN 42, and a VPN 44. An air telephone system 28 also may be included as an alternative to the satellite return link.

The mobile system 20 disposed on each aircraft 12 is shown in FIG. 2 and shall be discussed with reference to the aircraft 12a. The mobile system 20 includes a data content management system in the form of a router/server 50 (hereinafter "server"). The server 50 is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an up-converter 72 for encoding, modulating, and up-converting data content signals from the server 50 to a transmit antenna 74. The receiver subsystem 66 includes a decoder 76, a demodulator 78 and a down-converter 80 for decoding, demodulating and down-converting signals received by a receive antenna 82 into baseband video and audio signals, as well as data signals. While only one receiver subsystem 66 is shown, a plurality of receiver subsystems 66, and a corresponding plurality of components 76–80, typically are included to enable simultaneous reception of RF signals from a plurality of RF transponders.

The signals received by the receiver subsystem 66 are input to the server 50. A system controller 84 is used to control all subsystems of the mobile system 20. The system controller 84 provides signals to an antenna controller 86 which is used to electronically steer the receive antenna 82 to maintain the receive antenna 82 pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In such case the transmit antenna 74 and the receive antenna 82 are combined into a single antenna.

The local area network (LAN) 56 is used to interface the server 50 to a plurality of access stations 88 associated with each seat location on board the aircraft 12a. Each access station 88 can be used to provide direct two-way communication between the server 50 and a user's laptop computer, personal digital assistant (PDA) or other personal computing device of the user. The access stations 88 could also each include a seat-back-mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12a. The receive and transmit antennas 82 and 74, respectively, may include any form of steerable antenna, including electronically scanned, phased array antennas.

Referring further to FIG. 1, in the operation of the system 10, data content is preferably formatted into Internet Protocol (IP) packets before being transmitted either by a ground station 22 (hereinafter referred to as a "forward link" transmission) or from the transmit antenna 74 of each mobile system 20. IP packet multiplexing also is employed such that data content can be provided simultaneously to each of the aircraft 12 operating, for example, within the coverage region 14a using unicast, multicast and broadcast transmissions. The IP packets received by each of the transponders $18a_1$–$18a_4$ are transponded by the transponders to each aircraft 12 operating within the coverage region 14a.

The receive antenna 82 and transmit antenna 74 are each disposed on the top of the fuselage of their associated aircraft 12. The receive antenna 82 of each aircraft 12 receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and down-converts the encoded RF signals to produce video and audio signals, as well as data signals, that are input to the server 50.

The server 50 operates to filter off and drop any data content not intended for users on the aircraft 18 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

The system 10 is also capable of receiving Direct Broadcast Satellite (DBS) transmissions of live television programming, for example, programming provided by DirecTV® and Echostar®. DBS transmissions occur in a frequency band designated for broadcast satellite services (BSS) and are typically circularly polarized in North America. The FSS frequency band that carries the data services and the BSS frequency band that carries DBS transmissions are adjacent to each other in the Ku-band. Thus a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. Simultaneous reception from multiple satellites 18 is accomplished using a multi-beam antenna 82 with satellites co-located in the same geostationary orbit slot.

Rebroadcast television or customized video services are received and processed in the same way. Referring for example to the coverage area 14a, rebroadcast television or customized video content is obtained from the video content source 32 and transmitted via the ground station 22a to the FSS satellites 18a and 18b. The video content is encoded for transmission, for example, by the content center 24a, before being broadcast by the ground station 22a. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using a private portal data content. This content is implemented as a set of HTML pages housed on the server 50 of each mobile system 20. The content is kept fresh by periodic updates from a ground-based server located, for example, in content center 24a, and in accordance with a scheduling function controlled by the NOC 26 of the ground segment 16.

The system 10 also provides direct Internet connectivity via satellite links, for example, when a user on board an aircraft 12 desires to obtain data content that is not cached on the on-board server 50, or as an avenue for content sources to provide fresh content for the private portals. Refreshing of the cached content of the portal may be accomplished, for example, by in-flight, periodic "pushed" cache refresh over the satellite links.

Referring further to FIGS. 1 and 2, a transmission of data content from the aircraft 12a to the ground station 22a will be described. This transmission is termed a "return link" transmission. The antenna controller 86 causes the transmit antenna 74 to maintain the antenna beam thereof pointed at the target satellite 18a. The channels used for communication from each mobile system 20 back to a ground station 22 represent point-to-point links that are individually assigned and dynamically managed by the NOC 26 of the ground segment 16. When the system 10 is to accommodate several hundred or more aircraft, multiple aircraft are assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile systems 20 may be assigned to a single transponder $18a_1$–$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is preferably slaved to the point direction and polarization of the receive antenna 82. Alternatively, an open-loop tracking method may be used with the pointing direction and polarization determined by knowledge of mobile platform position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders $18a_1$–$18a_4$, and transponded by the designated transponder to the ground station 22. The ground station 22 communicates with the content center 24 to determine and provide the data being requested by the user (e.g. content from the world-wide web, email or information from the user's VPN).

The aperture size of a receive antenna 82 typically is smaller than that of conventional "very small aperture terminal" (VSAT) antennas. Accordingly, the beam from the receive antenna 82 might encompass adjacent satellites along the geo-synchronous arc, resulting in interference being received by a particular mobile system 20 from satellites other than the target satellite. Thus the system 10 uses a lower than normal forward link data rate to overcome such interference. For example, the system 10 operates at a forward link data rate of about 5 Mbps per transponder, using a typical FSS Ku-band transponder (e.g. Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. FCC regulations, however, presently regulate the maximum effective isotropic radiated power (EIRP) spectral density from a transponder to prevent interference between closely spaced satellites. Accordingly, spread-spectrum modulation techniques can be used in modulator 70 to "spread" the forward link signal over the transponder bandwidth using well-known signal spreading techniques. Spectral density of the transponded signal is reduced, and thus the possibility of interference between two or more mobile systems 20 is eliminated. Spread-spectrum modulation techniques also can be used on return link transmissions, so that the signal transmitted by a transmit antenna 74 is spread below the threshold EIRP spectral density at which the signal would cause interference to satellites adjacent to the target satellite 18.

FIG. 3 illustrates several of the previously described ground facilities associated with the coverage region 14a in which mobile platforms 12a and 12b are traveling. Data content is received by the data content center 24a from the previously described external data content providers, for example, ISP 30 and video content source 32 (shown in FIG. 1). The content is formatted into IP packets for delivery to the mobile platforms 12. Packets are time stamped, that is, tagged with expiration dates and priority or quality of service (e.g. guaranteed or best effort) for delivery. As previously described, scheduling information is available to the ground station 22a from the NOC 26. Packets and groupings of related packets (e.g. related web pages tagged with the same time stamp) are scheduled for broadcast delivery to the platforms 12a and/or 12b via satellite link. The scheduling is based on time stamp. The foregoing formatting, time stamping and scheduling functions are performed by a content delivery apparatus 98 residing in one or more processors, for example, at the content center 24a. Although the apparatus 98 is shown in FIG. 3 as being located in the content center 24a, the apparatus 98 can reside on other processors, for example, at the associated ground station 22a, and also can reside on processors in more than one location.

Content is streamed to the ground station 22a for satellite transmission to the platforms 12a and/or 12b. More specifically, the content may be streamed from the content delivery apparatus 98, directly or by one or more intermediary routers (not shown), to a last router 100 serving the ground station 22a. The ground station router 100, utilizing one or more RF link buffers (not shown in FIG. 3), streams the content packets to equipment chains 102 providing transponder feed via antenna to the satellites 18. Each equipment chain 102 transmits data to one satellite 18 transponder. For example, as shown in FIG. 3, equipment chains 102a–d transmit respectively to transponders $18a_1$–$18a_4$. Although not shown in FIG. 3, additional equipment chains 102 can transmit data to transponders on other satellites 18.

Each of the mobile platforms 12a and 12b is assigned to one or more transponders on the satellites 18. The platform/transponder assignments for the platforms 12a and 12b are available to the ground segment 16 (shown in FIG. 1). When a platform 12 receives a transmission from the content delivery apparatus 98, the received content is checked for completeness on board the platform 12, for example, by the on-board router/server 50 (shown in FIG. 2). The platform 12 sends confirmation to the content delivery apparatus 98 via the ground station 22a for content that arrived and was complete.

FIG. 4 illustrates a system 200 for monitoring a workload for the data content delivery apparatus 98. A workload monitor 204 resides, for example, on one or more processors in the NOC 26, content center 24a, and/or ground station 22a. The monitor 204 monitors, via the last router 100, the loading of content on each RF link buffer 208 utilized by the router 100 to transmit the content via RF link to the platforms 12. From the router 100 the monitor 204 determines a router content queue and router data transfer rate for content being delivered via the RF link buffers 208. The monitor 204 uses the buffer loading information to determine utilization of bandwidth by the RF link(s) through the equipment chains 102.

The monitor 204 determines, from the content delivery apparatus 98, a plurality of parameters describing the content to be delivered. Size of content received by the content delivery apparatus 98 and estimated bandwidth for transmitting the content are among such parameters. Another such parameter is priority of the content for delivery, for example, whether delivery is guaranteed or is to be best-effort. Yet another parameter is delivery mode for the content, for example, whether the content is broadcast or transmitted point-to-point. Based on the foregoing parameters and the link buffer bandwidth utilization determinations, the monitor 204 reports, to the content delivery apparatus 98, bandwidth available for allocation to the content.

The system 200 is configured to determine the above described parameters and bandwidth utilization for the plurality of content services, including Internet access and live television programming, provided to the platforms 12a and/or 12b as previously described. Based on the foregoing parameters and bandwidth utilization information, utilization of the available bandwidth can be optimized for the plurality of content services. Additionally, the monitor 204 reports information such as sizes and status of content deliveries, average delivery cycle, and other information useful to the content delivery apparatus 98 in initiating content delivery so as to optimize bandwidth.

The system 200 also includes a link management apparatus 212 configured to provide information to the monitor 204 as to (a) what types of content a mobile platform 12 is configured to receive, and (b) what quality of service is to be utilized in delivering content to the platform 12. The link management apparatus 212 resides, for example, on one or more processors in the data center 24a, the ground station 22a and/or in the NOC 26. In one preferred embodiment, the link management apparatus 212 provides information to the monitor 204 as to which of the mobile platforms 12 are available to receive content delivery, and the monitor 204 reports to the content delivery apparatus 98 percentages of platforms 12 being serviced.

The system 200 provides information that can be used to optimize dynamically the fixed bandwidth available for transmission of content to the platform 12. Bandwidth can be optimized based on characteristics of content as received by the content delivery apparatus 98 and as transmitted via the RF links. It is contemplated that bandwidth optimization can be achieved by monitoring content delivery electronically and visually according to embodiments of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for monitoring a workload for a data content delivery apparatus of a communications network, the content delivery apparatus configured to deliver content to a plurality of mobile users via at least one buffered RF link over a fixed bandwidth, the system comprising:
   a last router configured to route the content from the content delivery apparatus to at least one RF link buffer for transmission to the users; and
   a monitor configured to:
      determine, from the content delivery apparatus, a plurality of parameters describing the content for delivery;
      determine, from the router, utilization of the bandwidth via the at least one buffer; and
      report, to the content delivery apparatus, bandwidth available for allocation to the content based on the parameters and the bandwidth utilization.

2. The system of claim 1 wherein the content delivery apparatus initiates delivery of content via the at least one RF link based on time stamp, and wherein the parameters comprise a priority of the content for delivery.

3. The system of claim 2 wherein the priority comprises one of guaranteed and best-effort.

4. The system of claim 1 wherein the parameters comprise a delivery mode for the content.

5. The system of claim 4 wherein the delivery mode for the content comprises one of broadcast and point-to-point.

6. The system of claim 1 wherein the monitor is further configured to obtain from the router at least one of a router content queue and a router data transfer rate for content being delivered via the at least one buffer.

7. The system of claim 1 wherein the communications network services a plurality of mobile platforms on which mobile users are situated, and wherein the monitor is further configured to report at least one of a size of a content delivery, a status of a content delivery, an average delivery cycle, and a percent of platforms being serviced.

8. The system of claim 1 wherein the content delivery apparatus delivers a plurality of content services to the users, and wherein the monitor is further configured to determine the parameters and bandwidth utilization for each of the services.

9. The system of claim 8 further configured to optimize utilization of the available bandwidth by the plurality of content services.

10. The system of claim 1 wherein the communications network services a plurality of mobile platforms on which the mobile users are situated, and wherein the system further comprises a link management apparatus configured to provide at least one of: (a) an indication of which of the mobile platforms are available to receive content delivery, (b) an indication of what types of content at least one of the mobile platforms is configured to receive, and (c) an indication of what quality of service is to be utilized in delivering content to at least one of the platforms.

11. A method for optimizing bandwidth utilization by a communications network that provides communication between a content delivery apparatus and a plurality of mobile platforms, each of the platforms configured to communicate over the network via at least one RF link, the method comprising the steps of:
   determining, from a last router that routes communication content from the content delivery apparatus to the platforms, bandwidth utilization on the at least one RF link to the platforms;
   determining, from the content delivery apparatus, bandwidth needed by the content delivery apparatus to transmit content to the platforms; and
   allocating bandwidth for the content delivery apparatus based on the determined bandwidth utilization and the determined bandwidth needed.

12. The method of claim 11 wherein the content delivery apparatus provides a plurality of communication services to the platforms, and wherein the step of determining bandwidth needed by the content delivery apparatus comprises the step of determining, from a link management system, which of the platforms are available to receive content and which of the communication services are to be provided to the available platforms.

13. The method of claim 12 further comprising the step of determining, from the link management system, a quality of service to be provided to an available platform.

14. The method of claim 11 wherein the step of determining bandwidth utilization on the at least one RF link comprises monitoring each of a plurality of buffers supplying data to the at least one RF link, said step being performed using the last router.

15. The method of claim 11 further comprising the step of allocating bandwidth for the content delivery apparatus based on at least one of a size of a content delivery, an average delivery cycle for the content delivery apparatus and a percentage of platforms receiving content.

16. A communications network having a content delivery apparatus that delivers content to a plurality of mobile platforms via at least one buffered RF link over a fixed bandwidth, the network comprising:
   a last router configured to route the content from the content delivery apparatus to at least one RF link buffer for transmission to the platforms; and
   a monitor configured to:
      determine, from the content delivery apparatus, a plurality of parameters describing the content for delivery;
      determine, from the router, utilization of the bandwidth via the at least one buffer; and
      report, to the content delivery apparatus, bandwidth available for allocation to the content based on the parameters and bandwidth utilization.

17. The network of claim 16 wherein the content delivery apparatus initiates delivery of content via the at least one RF link based on time stamp, and wherein the parameters comprise a priority of the content for delivery.

18. The network of claim 16 wherein the parameters comprise a delivery mode for the content.

19. The network of claim 16 wherein the monitor is further configured to obtain from the router at least one of a router content queue and a router data transfer rate for content being delivered via the at least one buffer.

20. The network of claim 16 wherein the monitor is further configured to report at least one of a size of a content delivery, a status of a content delivery, an average delivery cycle, and a percent of platforms being serviced.

21. The network of claim 16 wherein the content delivery apparatus delivers a plurality of content services to the platforms, the monitor further configured to optimize utilization of the available bandwidth by the plurality of content services.

22. The network of claim 21 wherein the monitor is further configured to determine the parameters and bandwidth utilization for each of the services.

* * * * *